(12) United States Patent
Morrison et al.

(10) Patent No.: US 9,280,179 B2
(45) Date of Patent: Mar. 8, 2016

(54) MULTI-FUNCTION INFORMATION HANDLING SYSTEM TABLET WITH MULTI-DIRECTIONAL COOLING

(71) Applicant: Dell Products L.P., Round Rock, TX (US)

(72) Inventors: John T. Morrison, Round Rock, TX (US); Srinivas Kamepalli, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 418 days.

(21) Appl. No.: 13/711,048

(22) Filed: Dec. 11, 2012

(65) Prior Publication Data

US 2014/0160657 A1  Jun. 12, 2014

(51) Int. Cl.
*G06F 1/16* (2006.01)
*G06F 1/20* (2006.01)

(52) U.S. Cl.
CPC .............. *G06F 1/1626* (2013.01); *G06F 1/166* (2013.01); *G06F 1/1632* (2013.01); *G06F 1/203* (2013.01)

(58) Field of Classification Search
CPC .................... G02F 1/133382; G02F 1/133385; G02F 1/1601; G02F 2200/1631; G02F 3/011; H05K 7/20954–7/2099; G09G 5/38; G09G 2340/0492; G09G 2354/00
USPC .......................................... 361/679.21–679.3
See application file for complete search history.

(56) References Cited

U.S. PATENT DOCUMENTS

| | | | |
|---|---|---|---|
| 5,794,371 A | 8/1998 | Camillery | |
| 7,011,285 B2 | 3/2006 | Wang et al. | |
| 7,626,569 B2 | 12/2009 | Lanier | |
| 7,706,579 B2 * | 4/2010 | Oijer | G06K 9/00228 345/649 |
| 7,859,841 B2 * | 12/2010 | Tamura | G06F 1/203 361/679.06 |
| 7,946,921 B2 * | 5/2011 | Ofek et al. | 463/37 |
| 7,978,376 B2 | 7/2011 | Divine | |
| D670,703 S | 11/2012 | Hasbrook et al. | |
| 8,358,321 B1 * | 1/2013 | Weidner | G09G 5/00 345/619 |
| 8,543,227 B1 * | 9/2013 | Perek | G06F 1/1618 463/39 |
| 8,548,608 B2 | 10/2013 | Perek et al. | |
| 8,619,416 B2 * | 12/2013 | Lim | G06F 1/1632 361/679.41 |
| 8,873,227 B2 * | 10/2014 | Whitt, III | G06F 1/1669 361/679.09 |
| 9,052,814 B2 * | 6/2015 | Ording | G06F 3/0485 |
| 9,070,229 B2 * | 6/2015 | Williamson | G06F 1/1626 |
| 9,071,750 B2 * | 6/2015 | Osuga | H04N 5/23238 |
| 2003/0095152 A1 | 5/2003 | Fong | |

(Continued)

FOREIGN PATENT DOCUMENTS

EP  2457422  5/2012

*Primary Examiner* — Anthony Haughton
*Assistant Examiner* — Matt Dhillon
(74) *Attorney, Agent, or Firm* — Terrile, Cannatti, Chambers & Holland, LLP; Robert W. Holland (57) ABSTRACT

A tablet information handling system processes information with processing components disposed in a planar housing for presentation as images at a display disposed at the upper surface of the planar housing. Support members extend at the lower surface of the planar housing to support the planar housing in an upright configuration having the housing in a first orientation or an inclined configuration having the housing in a second orientation. A cooling fan controller manages cooling airflow direction through the planar housing based upon the orientation of the planar housing to blow hot air exiting the housing in a direction away from the likely location of an end user relative to the planar housing.

19 Claims, 8 Drawing Sheets

(56) References Cited

U.S. PATENT DOCUMENTS

| | | | |
|---|---|---|---|
| 2004/0261421 A1* | 12/2004 | McEuen et al. | 62/3.2 |
| 2007/0062089 A1* | 3/2007 | Homer et al. | 40/754 |
| 2007/0205997 A1 | 9/2007 | Lieshout et al. | |
| 2008/0122660 A1 | 5/2008 | Koganei | |
| 2009/0237420 A1* | 9/2009 | Lawrenz | G06F 1/1601 345/649 |
| 2010/0007613 A1 | 1/2010 | Costa | |
| 2010/0053075 A1 | 3/2010 | Cohen et al. | |
| 2010/0085298 A1 | 4/2010 | Cohen et al. | |
| 2010/0117955 A1 | 5/2010 | Cohen et al. | |
| 2011/0164358 A1* | 7/2011 | Duan et al. | 361/679.01 |
| 2011/0298829 A1* | 12/2011 | Stafford | G06K 9/3208 345/659 |
| 2012/0081576 A1* | 4/2012 | Seo | G03B 17/02 348/231.6 |
| 2012/0176741 A1 | 7/2012 | Wu et al. | |
| 2012/0218707 A1* | 8/2012 | Chan | 361/679.48 |
| 2012/0248277 A1 | 10/2012 | Yang et al. | |
| 2012/0256961 A1* | 10/2012 | Ogasawara | A63F 13/06 345/659 |
| 2012/0303476 A1* | 11/2012 | Krzyzanowski et al. | 705/26.5 |
| 2013/0038634 A1* | 2/2013 | Yamada et al. | 345/649 |
| 2013/0069988 A1* | 3/2013 | Kamei | G06F 1/1637 345/658 |
| 2013/0076964 A1* | 3/2013 | Sirpal | G06F 3/1438 348/333.12 |
| 2013/0144446 A1 | 6/2013 | Rihn et al. | |
| 2013/0154989 A1 | 6/2013 | Campbell | |
| 2013/0176240 A1 | 7/2013 | Autran et al. | |
| 2013/0229100 A1 | 9/2013 | Siddiqui et al. | |
| 2013/0229534 A1* | 9/2013 | Panay et al. | 348/207.1 |
| 2013/0229760 A1 | 9/2013 | Whitt et al. | |
| 2013/0231755 A1* | 9/2013 | Perek et al. | 700/66 |
| 2013/0286623 A1* | 10/2013 | Slipy | H04M 1/0202 361/807 |
| 2014/0035942 A1 | 2/2014 | Yun et al. | |

\* cited by examiner

MULTI-FUNCTION INFORMATION HANDLING SYSTEM TABLET WITH MULTI-DIRECTIONAL COOLING

CROSS REFERENCE TO RELATED APPLICATIONS

U.S. patent application Ser. No. 13/710,988, entitled "Multi-Function Information Handling System With Multi-Orientation Stand," inventors Trevor Morrison and Srinivas Kamepalli, filed on same day herewith, describes exemplary methods and systems and is incorporated by reference in its entirety.

BACKGROUND OF THE INVENTION

1. Field of the Invention

The present invention relates in general to the field of information handling system devices, and more particularly to a multi-function information handling system tablet having adjustable viewing and cooling configurations.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Consumers have come to expect that an information handling system will adapt to perform multiple functions with user-friendly interfaces. Desktop and other types of non-portable information handling systems have generally fallen out of favor with many consumers who expect to carry their information handling system with them. A typical desktop information handling system setup has bulky and awkward wires that interface peripherals, such as displays and keyboards, and a relatively large footprint that consumes desktop or office space. Desktop information handling systems do tend to have larger-sized chassis with greater storage, which makes them convenient as a household server and central data repository. Laptop information handling systems have traditionally offered portability by using a clamshell configuration having a display and keyboard on opposing portions of a rotationally-coupled chassis. The clamshell configuration offers portability with adequate room to hold powerful components having processing capabilities on par with those found in many desktop information handling systems. End users who prefer greater portability than that offered by a clamshell configuration tend to select tablet information handling systems that typically accept inputs through a touchscreen display integrated in a flat chassis. Tablet information handling systems provide convenient information consumption, such as for presenting entertainment like movies, but tend to have more limited processing capabilities due to the relatively smaller size of the typical tablet chassis. The smaller chassis size also tends to limit the size of the display and, thus, the end user's entertainment experience.

Tablet information handling systems have limitations for performing some functions expected from desktop and laptop information handling systems. One limitation is the lack of a built in keyboard. Tablets generally include a touchscreen that presents a keyboard and accepts inputs; however, a touchscreen keyboard is typically more difficult for an end user to use resulting in slower inputs. Further, a touchscreen keyboard consumes display space and detracts from presentation of other information. Another limitation is the generally small size of the display screen included in a tablet. Although a small display supports information consumption, such as email reading, web browsing and movie watching, end users often must expand an image presented at the display to comfortably view information. Even if an end user interfaces a peripheral keyboard and mouse with a tablet, the small screen size tends to make effective information creation difficult. Further, with a small chassis and limited room to expel excess thermal energy generated by processing components, tablets typically have less powerful processors that have difficulty with complex computing tasks. Another limitation with tablets is that the planar housing can be somewhat awkward for an end user to hold and make inputs. Docking stations are available to hold tablets, however, docking stations are inconvenient for end users to carry around.

SUMMARY OF THE INVENTION

Therefore a need has arisen for a system and method which supports a tablet information handling system having an improved display presentation.

In accordance with the present invention, a system and method are provided which substantially reduce the disadvantages and problems associated with previous methods and systems for presenting information at a tablet information handling system. Support members extend outward at the bottom surface of the tablet information handling system planar housing to hold the planar housing at plural angles relative to a resting surface, such as a desktop. Changing the orientation of the planar housing relative to the resting surface arranges the support members to hold the planar housing in different orientations, such as inclined and upright orientations selected with 180 degrees of rotation relative to the resting surface. Changes in orientation of the planar housing relative to a likely location of an end user initiate changes in the direction of cooling airflow through the planar housing so that exhausted cooling airflow is directed away from the end user.

More specifically, a planar housing has plural processing components disposed in it that cooperate to process information, such as by execution of stored instructions. A display disposed over an upper surface of the planar housing interfaces with the processing components to present information as visual images. Support members extend outward from support cavities formed in the bottom surface of the planar housing to rest on a resting surface so that one side of the planar housing is elevated relative to an opposing side. In an inclined configuration, the support members rest substantially perpendicular to a resting surface to raise one side of the planar housing by a distance of the extension of the support members from the bottom surface. To transform from the inclined position to an upright position, the planar housing is rotated 180 degrees relative to the resting surface so that the support members are substantially parallel with the resting surface. Transitioning between inclined and upright configurations result in the image at the display being reoriented to maintain the images presented by the display upright relative to an end user. Cooling airflow through the planar housing removes excess thermal energy produced by processing components so that more powerful processing components may be included in the planar housing. The direction of cooling airflow exhaust from the planar housing is adjusted based upon the likely location of an end user relative to the planar housing. For example, if a docking connector of the planar housing couples with a docking station, then cooling airflow is directed upward and away from the docking station. As another example, if a weight switch associated with the support members detects an inclined or upright configuration, then the cooling airflow is directed in the same direction as the orientation of images presented at the display. Cooling airflow through the planar housing is exhausted in a desired direction by selecting a rotation direction for the fan.

The present invention provides a number of important technical advantages. One example of an important technical advantage is that an information handling system has the touch interaction of a tablet, the portability of a laptop and the productivity of a desktop. For example, a moderate sized Full High Definition (FHD) touchscreen display presents information with sufficient resolution to provide efficient information creation, yet fits in a housing thin enough and light enough to allow portability, such as a maximum thickness of about a finger width and a relatively light weight. Processing components are disposed in a housing that has more room than a typical tablet, which provides more efficient handling of excess thermal energy associated so that more powerful processing components may be included in the housing. More powerful processing components efficiently run applications that create information, such as word processing, spreadsheet and multimedia editing applications. In order to dissipate excess thermal energy, one or more cooling fans provide a cooling airflow with the direction of the airflow determined by the orientation of the information handling system. Orientation-based cooling airflow ensures end user comfort during operations that generate greater levels of thermal energy. Retractable support members extend from the housing to provide multiple orientations adaptable to multiple end user functional uses, such as upright, flat and inclined orientations provided by a set of retractable support legs. The tablet information handling system also docks to a docking station for use with peripherals in an all-in-one configuration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system in a planar housing offers the touch interaction of a tablet, the portability of a laptop and the productivity of a desktop having an all-in-one configuration. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
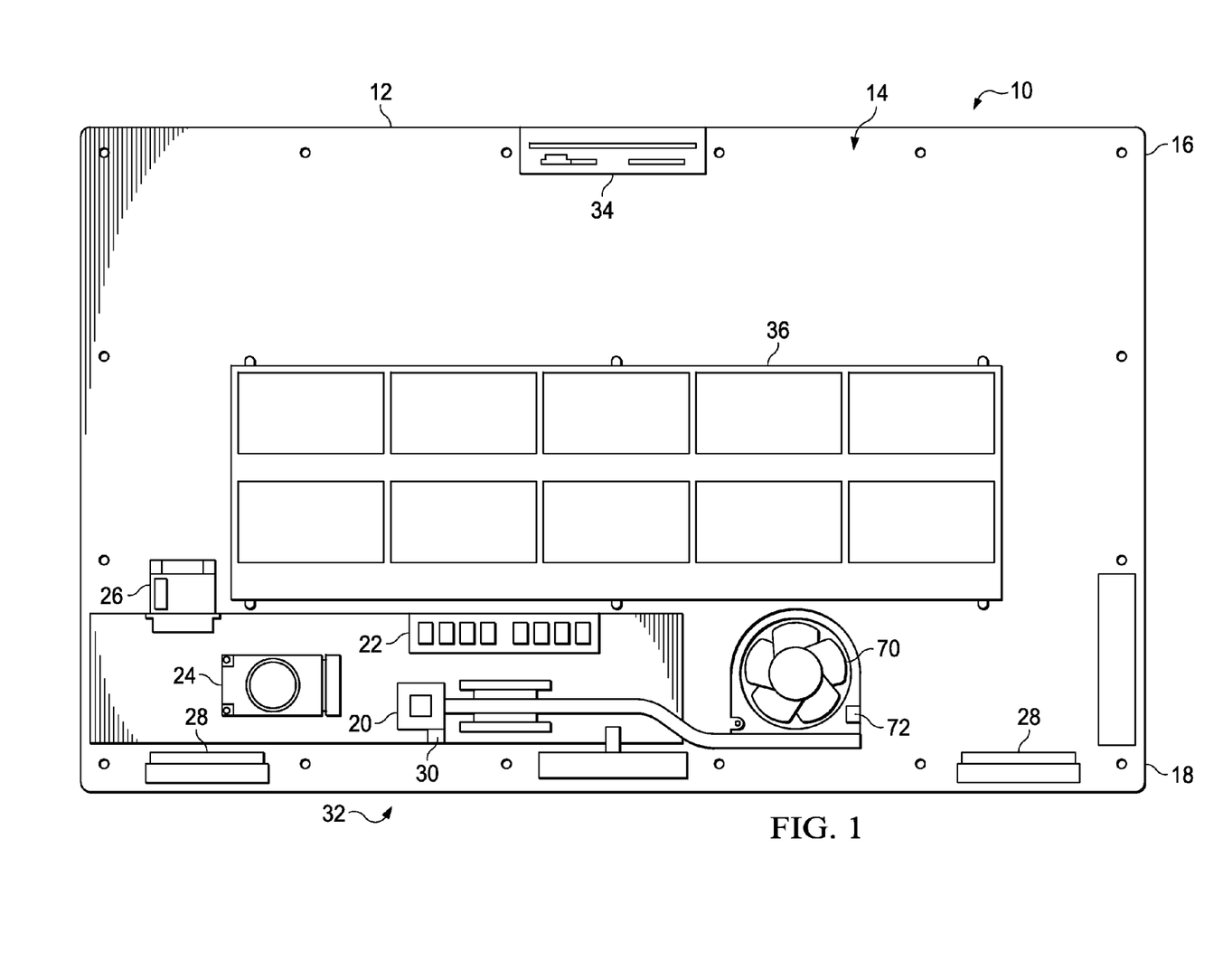
FIG. 1 depicts an information handling system having a planar housing to contain processing components that cooperate to process information.

Referring now to FIG. 1, a cutaway view depicts an information handling system 10 having a tablet configuration in a planar housing 12. The upper surface of planar housing 12 integrates with a touchscreen display 14 that presents information as visual images and accepts end user inputs as touches. In order to support multiple functions provided by both portable tablet and non-portable information handling systems, planar housing 12 is sized to support a display 14 that is larger than typical tablet displays. In one example embodiment, display 14 is an moderate sized FHD display supported by a planar housing 14 having a thickness of about a pencil at top portion 16 that tapers to a finger width thickness at bottom portion 18. The tapered thickness provides an angled surface on the bottom side of the housing opposite display 14 that aids movement of air from bottom portion 18 out top portion 16 with natural convection for enhanced cooling of processing components disposed in the thicker bottom portion 18. The processing components include a processor 20 that executes instructions to process information, a memory 22 interfaced with processor 20 to store instructions in support of processor 20, a solid state drive (SSD) 24 that stores information in non-volatile memory and a wireless card 26 that provides wireless networking interfaces, such as WLAN, WWAN and WPAN interfaces. Processor 20 executes instructions, such as applications, that generate visual information for presentation on display 14 and audio information for presentation by speakers 28. An orientation sensor 30, such as a gyroscope or an accelerometer, determines the orientation of planar housing 12 relative to gravity so that an orientation sensing logic 32 stored in memory 22 to execute on processor 20 can orient images presented by display 14 relative to gravity. A camera 34 captures images and provides captured image information to processor 20 for use, such as for videoconferencing. A battery 36 powers the processing components when external power is not available.

Figure 2:
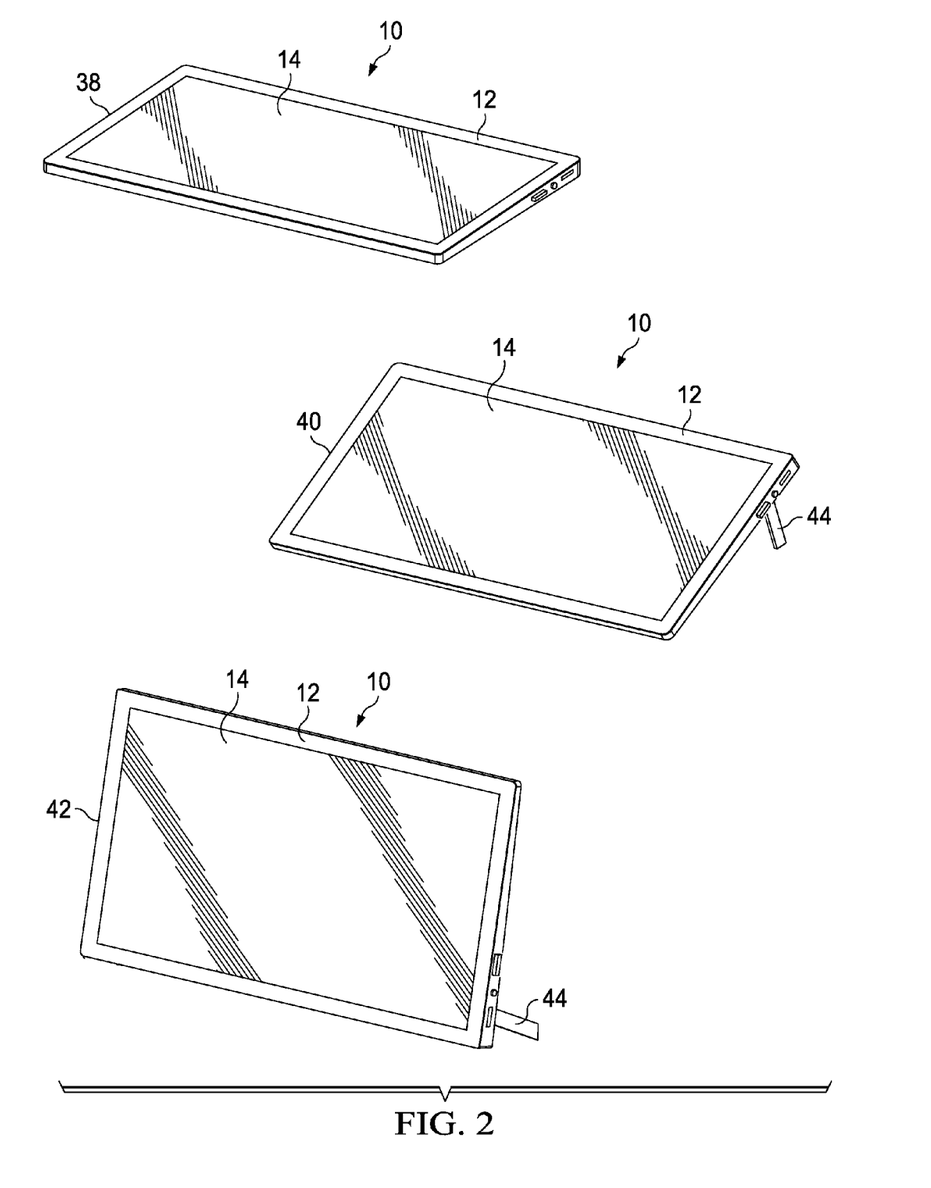
FIG. 2 depicts the information handling system planar housing having selectively extended support members that provide flat, inclined and upright configurations.

Referring now to FIG. 2, three example configurations are depicted for use of information handling system 10 that correspond to tablet and laptop usage models. In a flat configuration 38, planar housing 12's bottom surface rests on a resting surface, such as a table top, to provide an end user with a flat touchscreen display 14 with which to interact. In an inclined configuration 40, two opposing support members 44 extend out of the bottom surface of planar housing 12 to hold the bottom portion 18 of planar housing 12 at a higher elevation above the resting surface than the top portion 16 of planar housing 12. Inclined configuration 40 raises one side of planar housing 12 relative to a resting surface and to an opposing side of planar housing 12 so that an end user sitting above but to the side of planar housing 12 will have display 14 supported in a generally perpendicular position to the end user. Upright configuration 42 has the bottom portion 18 of information handling system 10 on the resting surface so that surface members 44 hold planar housing 12 generally perpendicular to the resting surface, such as in the position of an open laptop display. An end user converts information handling system 10 from the inclined position to the upright position by rotating planar housing 12 to place the portion raised in the inclined position downward and against the resting surface in the upright position.

Figure 3:
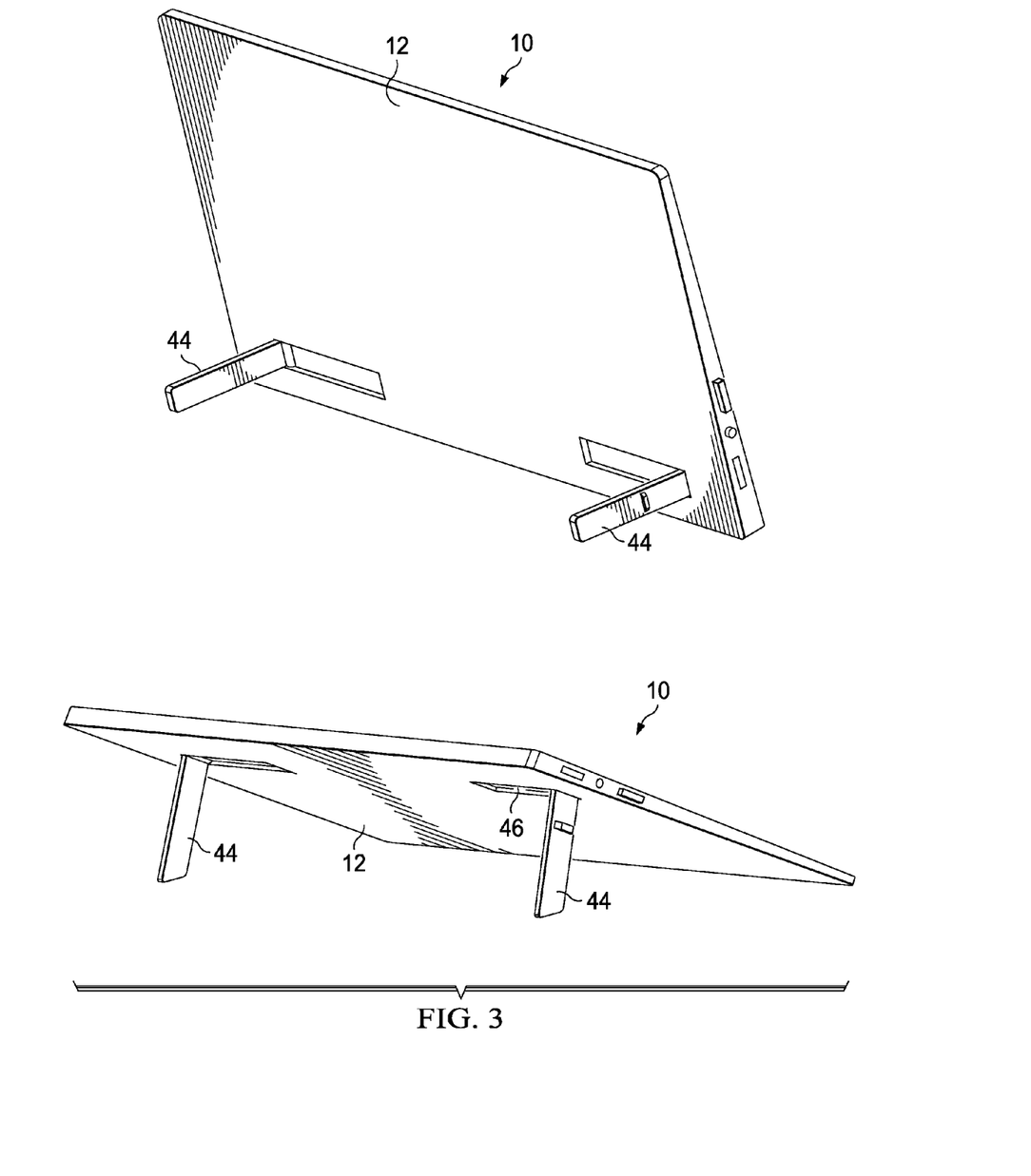
FIG. 3 depicts a rear perspective view of the information handling system planar housing raised with the support members over a support surface in the inclined and upright configurations.

Referring now to FIG. 3, a rear perspective view depicts information handling system 10 in the inclined and upright positions. Support members 44 extend outward from a retracted position within the bottom surface of planar housing 12 to the extended position, as depicted, that holds one side of planar housing 12 elevated above the resting surface. Support members 44 have an angled bottom to firmly rest against the resting surface. Support members 44 are substantially perpendicular to the resting surface and to planar housing 12 with some angle offset to establish the desired incline. In the inclined configuration, support members 44 raise planar housing above the resting surface by the distance that support members 44 extend outward from planar housing 12. Transition between the inclined and upright configurations with support members 44 extended is performed by raising planar housing 12 so that the side closest to support members 44 rests on the resting surface. In the upright configuration, planar housing 12 rests on support members 44 with support members 44 substantially parallel to the resting surface.

A transition between inclined and upright configurations results in an inversion of display 14 relative to the end user. In one embodiment, a weight sensor 46 disposed at the interface of one or more support members 44 and planar housing 12 detects a resting force placed upon support members 44 when support members 44 support planar housing 12 in the inclined or upright configurations. Weight sensors 46 determine whether the vector of the force results from an inclined or upright configuration and provides a determination of the inclined or upright configuration to orientation sensing logic 32 to align the presentation of images at display 14 with the determined configuration. As an alternative, orientation sensor 30 may be used to align images presented by display 14 while weight sensors 46 provide confirmation of the appropriate display image alignment. Although the example embodiment depicts two support members that rotate outward to an extended position, in alternative embodiments, the rotation may be inward with centrally-located pivot points. Other alternative embodiments may use a single support member or more that two support members to provide the inclined and upright configurations based upon a single common extended position of the support members.

Figure 4:
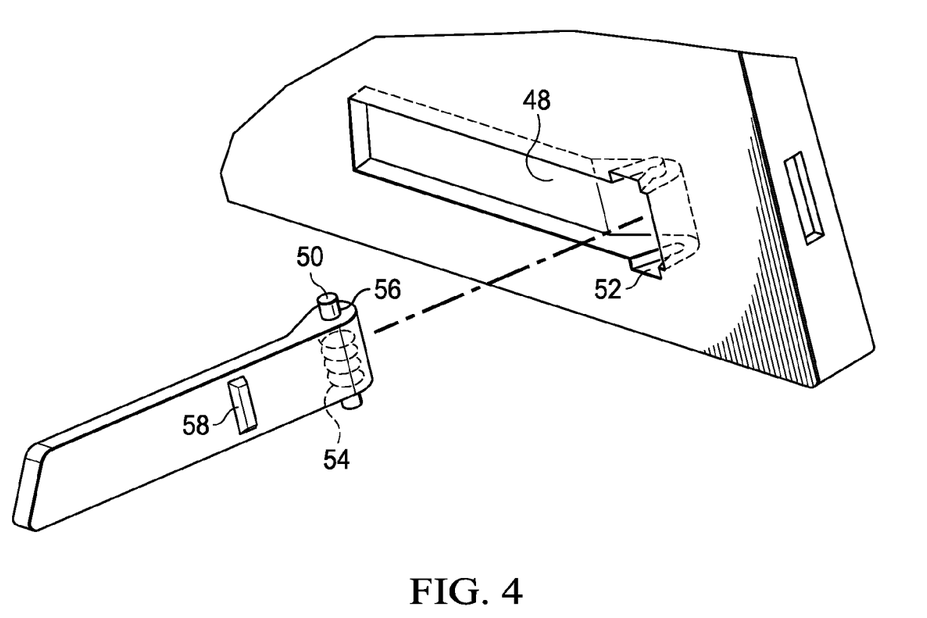
FIG. 4 depicts a blow-up view of a support member and a support cavity formed in the planar housing bottom surface.

Referring now to FIG. 4, a side view depicts a support member 44 separate from a support cavity 48 formed in planar housing 12 to store support member 44 when retracted. A pivot point 50 of support member 44 couples at support cavity 48 with a breakaway device 52 to allow support member 44 to rotate about pivot point 50. Breakaway device 52 applies pressure at pivot point 50 to hold support member 44 in place but releases support member 44 if an excessive force is applied to support member 44. A biasing device 54, such as a coil spring, provides a biasing force on support member 44 to retract into support cavity 48. A dampener 56 dampens the biasing force as a support member 44 enters into support cavity 48 to provide a smooth retraction of support member 44 into support cavity 48. A standoff 58 formed along the exposed surface of support member 44 engages with a resting surface when planar housing 12 is in the flat configuration. Standoff 58 provides a slight air gap across the bottom surface of planar housing 12 to aid in cooling by allowing air to flow across the bottom surface.

Figure 5:
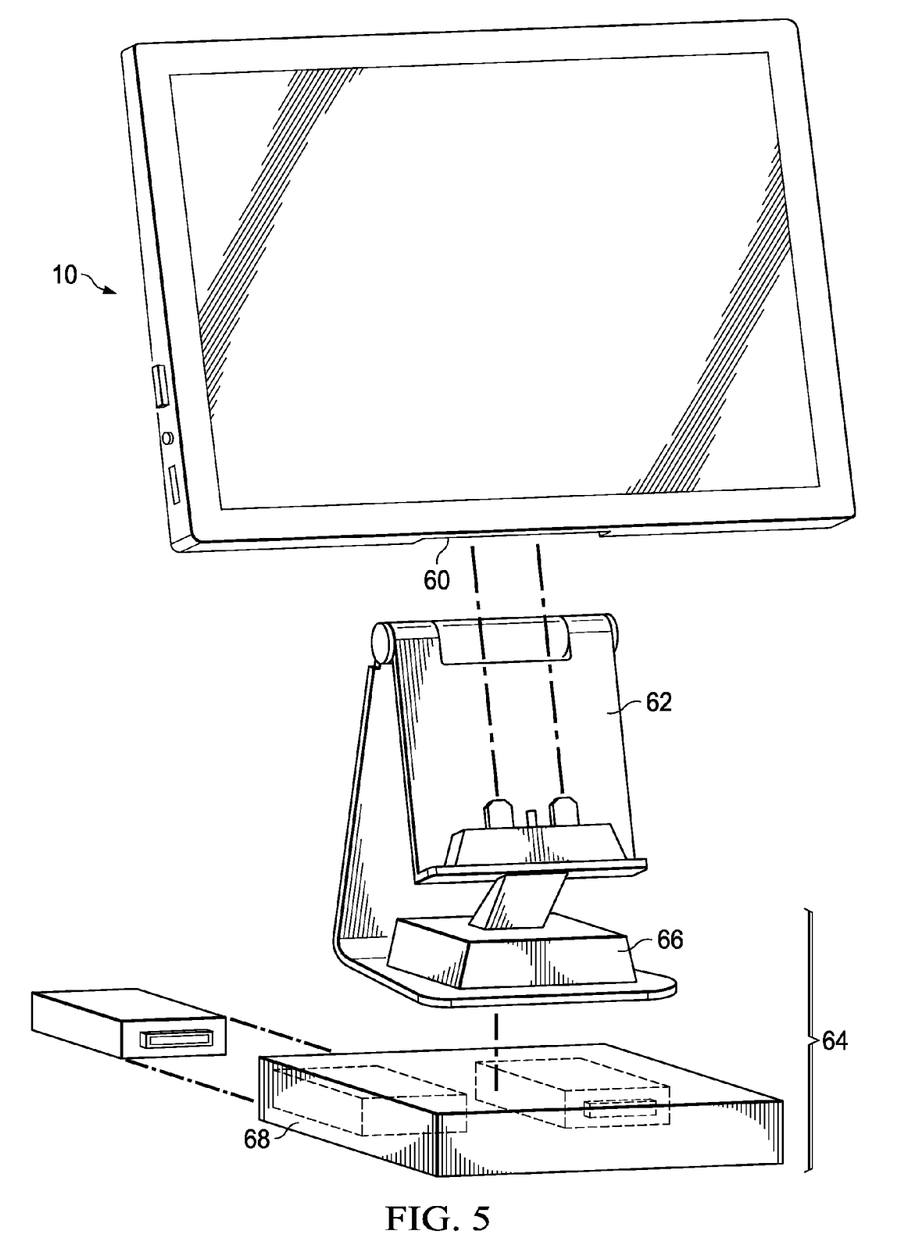
FIG. 5 depicts the information handling system planar housing aligned to couple with a docking station having performance boost subsystem.

Referring now to FIG. 5 a side view depicts information handling system 10 having a docking station connector 60 aligned to couple with a docking station 62. When docked, information handling system 10 provides functions similar to an all-in-one desktop information handling system, such as by interfacing peripherals with docking station 62 for use with a docked information handling system 10. In one embodiment, information handling system 10 obtains a boost in its performance with a performance boost subsystem 64 that includes storage, processing and cooling resources to supplement those within information handling system 10. For example, a cooling system 66 provides cooling for components within performance boost subsystem 64 and supplements cooling to information handling system 10, such as by providing cooling airflow through a duct formed proximate docking station connector 60. Performance boost modules 68 provide selectable processing enhancements that an end user can choose to include in docking station 62, such as additional non-volatile storage deployed as a RAID, graphics processing, networking capabilities, etc . . . Performance boost modules 68 enhance multi-function capabilities and provide information security for end users who desire to maintain desktop-type capabilities with a portable information handling system.

One difficulty with a multi-function information handling system 10 is that the more powerful components associated with performing complex tasks, such as more powerful processors, tend to have increased heat generation as a byproduct of information processing. In order to maintain information handling system 10 within a thermal range acceptable for portable use, one or more cooling fans 70 generate a cooling airflow within planar housing 12 under the management of one or more cooling fan controllers 72, as depicted by FIG. 1. To prevent discomfort to an end user caused by heated air exhausted from planar housing 12, cooling fan controllers 72 adjust the direction of the cooling airflow through planar housing 12 so that heated air is exhausted in a direction away from the expected location of an end user.

Figure 6:
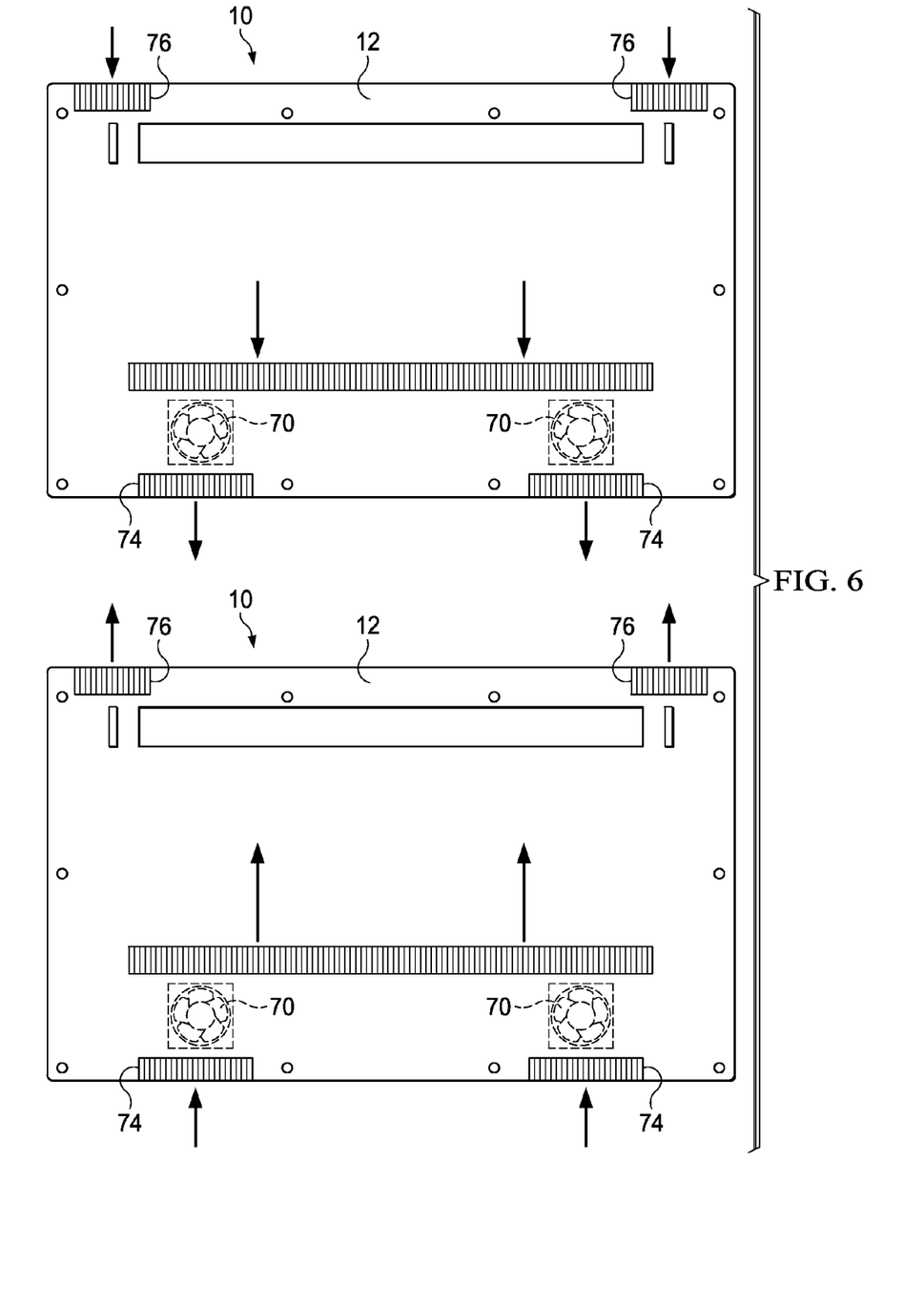
FIG. 6 depicts the information handling system planar housing having cooling airflow direction reversible by reversing the rotation of one or more cooling fans.

Referring now to FIG. 6, an example embodiment is depicted in which cooling airflow direction through planar housing 12 is reversed by reversing the direction in which cooling fans 70 rotate. If, for instance, the expected location of an end user is proximate the side of information handling system 10 having cooling fans 70, then cooling fans 70 rotate to draw air through inlets 74, past the processing components needing cooling, and out exhausts 76. If the expected location of an end user changes, then cooling fans 70 reverse the direction of their rotation to draw air into exhausts 76 and to push heated air out inlets 74. Cooling fan controller 72 selects a direction for cooling airflow based upon sensed operating conditions at information handling system 10. For example, cooling fan controller obtains orientation determinations from orientation sensing logic 32 and applies the orientation determinations to set the direction of rotation of cooling fans 70. In one embodiment, coupling of docking connector 60 to docking station 62 results in a command to have cooling airflow pass into information handling system 10 at inlets 74 near docking connector 60 and out exhausts 76 at the top of planar housing 12. In the docked configuration, exhausting cooling airflow out the top of information handling system 10 prevents heated air from exhausting in the position located in front of docking station 62 where an end user is likely to sit.

When information handling system 10 is not docked, then the direction of cooling airflow exhaust that is least likely to pass by an end user is typically a direction that corresponds with the orientation of images presented at display 14. Thus, in one example embodiment, when orientation sensor 30 detects an up orientation for display 14 to present images, the same orientation is used to send cooling airflow exhaust from planar housing 12. In one embodiment, when information handling system 10 is not docked, a more restrictive thermal profile is applied so that cooling airflow exhaust reaches lower maximum temperatures to reduce the risk of discomfort to an end user in the event than an inappropriate exhaust direction is selected. For example, higher fan speeds and lower processor clock speeds may be used to keep exhaust temperatures at lower maximum levels. In another embodiment, weight detected by weight sensors 46 that indicates an inclined or upright configuration with support members 44 may be used to determine cooling fan exhaust direction. Generally, both the image orientation and the cooling fan exhaust direction will reverse when information handling system 10 is rotated between the inclined and upright configurations. Since the detection of weight by weight sensors 46 provides a higher degree of certainty of the location of an end user relative to planar housing 12, a less restrictive thermal profile may be used in the upright and inclined configurations with a greater maximum exhaust temperature. In another example embodiment, camera 34 captures an image of an end user that is analyzed by orientation sensing logic 32 to determine the location of the end user for setting cooling fan exhaust direction away from the end user. Since the camera provides a definitive location of the end user relative to planar housing 12, less restrictive thermal constraints may be used that provide a greater maximum exhaust temperature.

Figure 7:
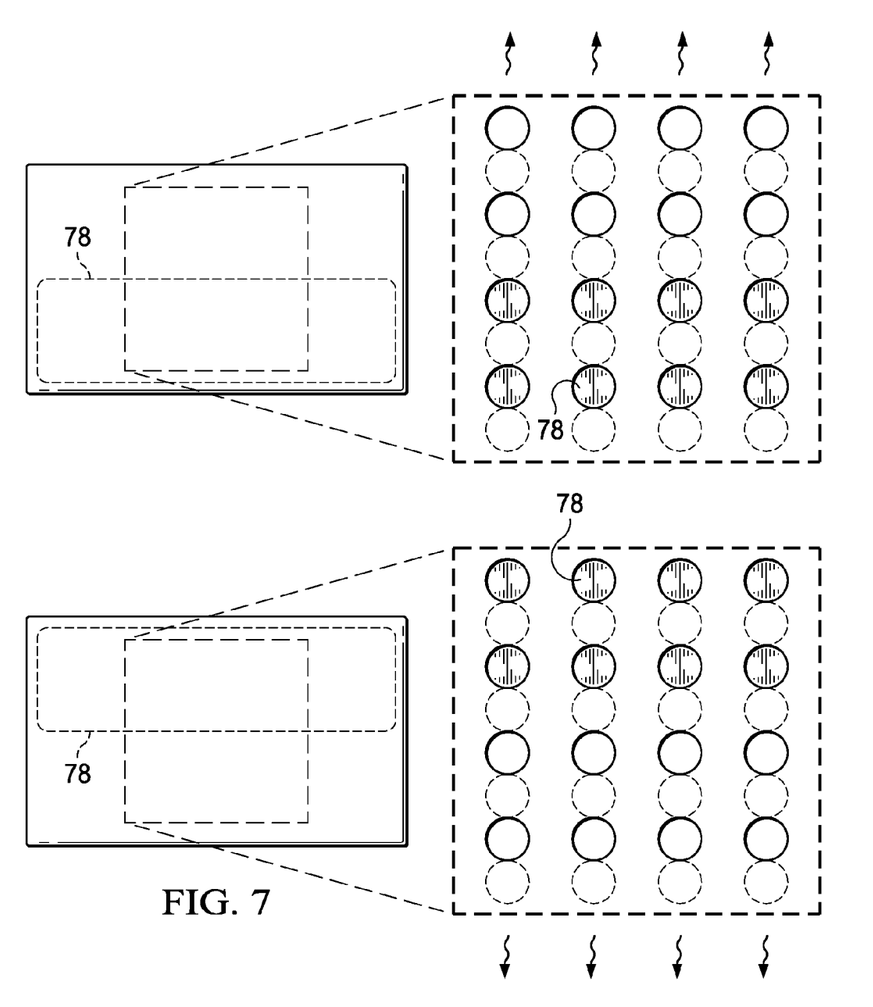
FIG. 7 depicts a damper that slides within the information handling system planar housing to selectively set the direction of cooling airflow exhaust.

Although reversing fan rotation direction provides control of cooling airflow direction, other embodiments may redirect cooling airflow through planar housing 12 in alternative ways. For example, if two cooling fans 70 are available, one cooling fan 70 is powered to provide cooling airflow in a first direction and the other cooling fan 70 is powered to provide cooling airflow in a second direction. FIG. 7 depicts another alternative embodiment in which a damper 78 slides between a first location to direct cooling airflow exhaust in a first direction and a second location to direct cooling airflow exhaust in a second direction. In one alternative embodiment, damper 78 is used in combination with cooling fan rotation direction reversal to direct heated exhaust in plural selectable directions. For example, damper 78 may engage to re-direct heated exhaust out a separate side opening based upon analysis of a camera image showing an end user at each of the normally-used cooling airflow inlets and exhausts.

Figure 8:
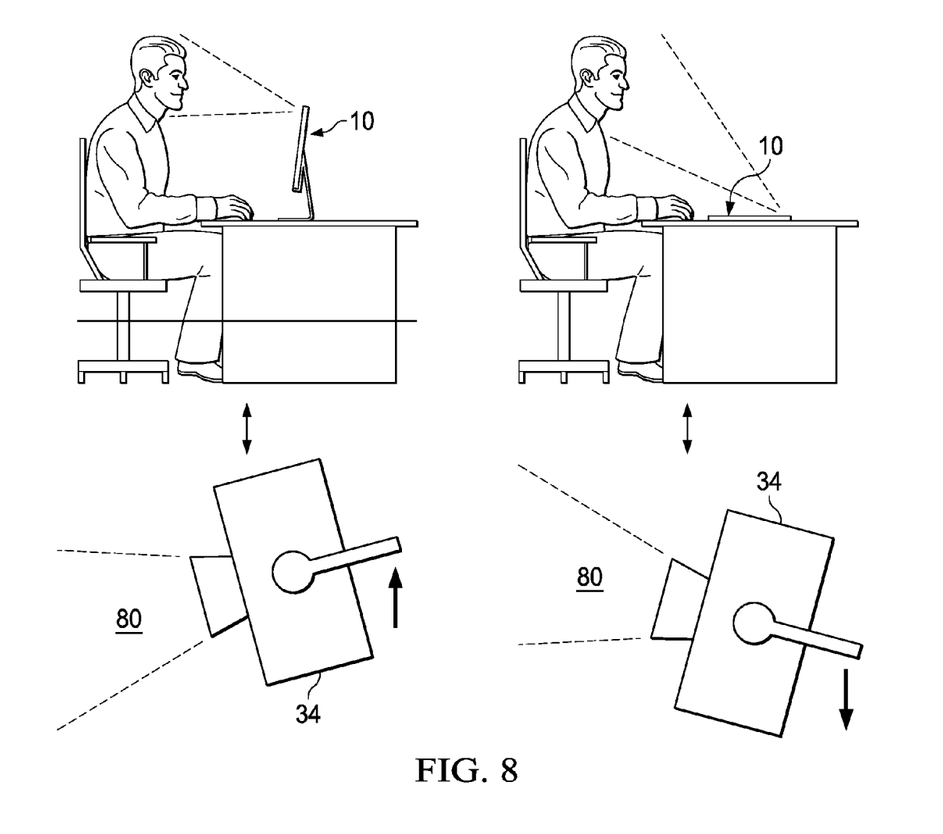
FIG. 8 depicts selective changes to a camera field of view based upon the configuration in which the information handling system planar housing is held.

Referring now to FIG. 8, adjustable camera orientation is depicted for use when information handling system 10 adjusts between flat, inclined and upright orientations. Camera 34 has a field of view 80 that generally centers on the area in front of display 14. For example, an end user sitting in front of a docked information handling system 10 will typically fall within the field of view around the area in front of display 14. In some instances, an end user may view display 14 from outside the field of view of camera 34, such as when information handling system is in a flat configuration and the end user is sitting to one side of the information handling system. To adjust to varying end user locations, camera 34 includes a solenoid that changes the field of view of the camera by moving the camera lens relative to planar housing 12. In one embodiment, camera 34 automatically adjusts the center of the field of view based up a determination that information handling system 10 is in a flat, inclined or upright configuration. After an initial adjustment based upon a detected configuration or an orientation sensor input, camera 34 searches for a facial image to further train the field of view at an end user.

Although the present invention has been described in detail, it should be understood that various changes, substitutions and alterations can be made hereto without departing from the spirit and scope of the invention as defined by the appended claims.

What is claimed is:

1. An information handling system comprising:
   a planar housing having an upper surface and lower surface;
   a docking station connector disposed at the housing and configured to couple and de-couple with a docking station;
   a processor disposed in the planar housing and operable to process information;
   a memory disposed in the planar housing and interfaced with the processor, the memory operable to store information;
   a display disposed at the upper surface and interfaced with the processor, the display operable to present information as visual images;
   one or more cooling fans disposed in the planar housing and operable to selectively move a cooling airflow in a first direction from one or more first openings through the planar housing to one or more second openings or in a second direction from the one or more second openings to the one or more first openings; and
   a cooling fan controller interfaced with the cooling fans and operable to select the first direction or the second direction based upon one or more predetermined conditions, the one or more predetermined conditions including at least a coupling or de-coupling by the docking station connector to a docking station to select the first or second directions.

2. The information handling system of claim 1 further comprising:
   an orientation detection device operable to detect orientation of the planar housing;
   wherein the predetermined condition comprises detection of a first or second orientation, the cooling fan controller selecting the first direction in response to detection of the first orientation and the second direction in detection to the second orientation.

3. The information handling system of claim 1 wherein the orientation detection device comprises a gyroscope.

4. The information handling system of claim 3 further comprising:
one or more supports operable to extend from the housing and retract into the housing, the supports holding the information handling system in one or more predetermined orientations when extended; and
a switch activated when the supports are extended, the switch acting as the orientation device when activated.

5. The information handling system of claim 1 further comprising:
a damper moveable between a first position that directs the cooling airflow in the first direction and a second position that directs the cooling airflow in the second direction;
wherein the cooling fan controller commands the damper to the first or second position based upon the one or more predetermined conditions.

6. The information handling system of claim 1 wherein the cooling fan controller selects the first direction by rotating the one or more cooling fans in a first direction and selects the second direction by rotating the one or more cooling fans in a second direction opposite the first direction.

7. The information handling system of claim 1 further comprising:
the one or more cooling fans disposed in the planar housing;
wherein the cooling fan controller selects the first direction by powering the first cooling fan and selects the second direction by powering the second cooling fan.

8. The information handling system of claim 1 further comprising:
a camera operable to capture an image of an end user facing the display;
wherein the predetermined condition comprises the orientation of the end user in the image.

9. A method for cooling information handling system housing, the method comprising:
drawing cooling airflow through a first opening of the housing, past one or more components disposed in the housing and out a second opening of the housing;
capturing an image of an end user with a camera, the camera disposed at the housing and oriented to capture images of an end user viewing position relative to a display disposed in the housing;
detecting a predetermined condition; and
a cooling fan controller interfaced with the cooling fans and operable to select the first direction or the second direction based upon one or more predetermined conditions,
in response to the predetermined condition, reversing the cooling airflow to draw the cooling airflow through the second opening, past the one or more components and out the first opening;
wherein the predetermined condition comprises the orientation of the end user in the image.

10. The method of claim 9 wherein detecting a predetermined condition further comprises detecting a coupling of the housing to a docking station.

11. The method of claim 9 wherein detecting a predetermined condition further comprises detecting a change in orientation of the housing.

12. The method of claim 11 wherein detecting a predetermined condition further comprises:
monitoring the orientation of the housing with an accelerometer; and
determining that a monitored orientation places the cooling airflow out of the housing in a direction associated with a position of an end user.

13. The method of claim 9 wherein detecting a predetermined condition comprises:
determining that an end user's location relative to the housing corresponds to the orientation of information presented on a display integrated in the housing; and
determining that the end user's location places the cooling airflow out of the housing in a direction of the end user.

14. The method of claim 9 wherein reversing the cooling airflow further comprises reversing the direction of rotation of a cooling fan disposed in the housing.

15. The method of claim 9 wherein reversing the cooling airflow further comprises disposing a damper in the cooling airflow to redirect the cooling airflow.

16. The method of claim 9 wherein reversing the cooling airflow further comprises:
powering down a first fan drawing the cooling airflow in a first direction; and
powering up a second fan drawing the cooling airflow in a second direction opposite the first direction.

17. A system for cooling an information handling system, the system comprising:
a cooling fan operable to rotate in a first direction or a second direction;
a camera oriented to capture an image of an end user viewing a display integrated with the information handling system;
an orientation detector operable to detect first and second orientations of the information handling system at least in part by analyzing the image of the end user to determine the orientation of the end user relative to the first and second direction;
a cooling fan controller interfaced with the cooling fan and the orientation detector, the cooling fan controller operable to select the first direction in response to the detection of the first orientation and to select the second direction in response to the second orientation, reversing the cooling airflow to draw the cooling airflow through the second opening, past the one or more components and out the first opening.

18. The system of claim 17 wherein the orientation detector comprises an accelerometer operable to detect orientation relative to gravity.

19. The system of claim 17 wherein the orientation detector comprises a display detector operable to detect the orientation of information presented at a display.

* * * * *